United States Patent

Snitzer

[15] 3,652,954
[45] Mar. 28, 1972

[54] LASER DEVICE

[72] Inventor: Elias Snitzer, 177 Hampshire Road, Wellesley, Mass. 02181

[22] Filed: July 10, 1970

[21] Appl. No.: 53,895

[52] U.S. Cl. .......................... 331/94.5, 252/301.4, 330/4.3
[51] Int. Cl. ...................... H01s 3/02, H01s 3/04, H01s 3/05
[58] Field of Search ................ 331/94.5; 252/301.4; 330/4.3

[56] References Cited

UNITED STATES PATENTS 3,356,966  12/1967   Miller .................................. 331/94.5

FOREIGN PATENTS OR APPLICATIONS 1,136,475  12/1968   Great Britain ....................... 331/94.5

Primary Examiner—Ronald L. Wibert
Assistant Examiner—R. J. Webster
Attorney—Lane, Aitken, Dunner & Ziems

[57] ABSTRACT

A laser device comprising a laser active component in the form of a rod and a sensitizer component in the form of a tubular cladding. The laser active component is mounted within the sensitizer component, and at least one surface of the sensitizer component is cooled to provide a more efficient device.

4 Claims, 4 Drawing Figures

INVENTOR
ELIAS SNITZER

BY Lane, Aitken, Dunner & Ziems
ATTORNEYS

PATENTED MAR 28 1972

INVENTOR
ELIAS SNITZER

BY
Lane, Aitken, Dunner & Ziems
ATTORNEYS 3,652,954

LASER DEVICE

BACKGROUND OF THE INVENTION

This invention relates to a laser device. In U.S. Pat. application Ser. No. 825,815, filed May 19, 1969, and assigned to the assignee of the present invention, the teachings of which are incorporated herein by reference, a laser device is disclosed in which the laser material is composed of laser active components and sensitizer components. The sensitizer components are doped with ions which enhance the fluorescence of the laser ions doped within the laser active components. In one embodiment, the laser active component is in the form of a rod, and the sensitizer component is in the form of a tubular cladding surrounding the rod in contact therewith. Light originating from a pump source, such as a flash tube, is absorbed by the sensitizer ions within the cladding and a large portion of this light energy is transferred to the laser ions within the rod to assist in producing an inversion in the laser ions within the rod. As is taught in application, Ser. No. 825,815, the two distinct components provide an efficient means for sensitizing the fluorescence of the laser ions to produce the necessary population inversion while preventing quenching of such fluorescence by the sensitizer ions as often occurred in prior art devices utilizing large concentrations of sensitizer ions.

Although the separate component device taught in application 825,815 produces more efficient results than any of the known prior art devices using similar dopants in a homogeneous laser rod, it has been discovered that the coupling efficiency between sensitizer and laser ions and prevention of quenching is further improved in accordance with the present invention by separating the components and passing a coolant fluid between the sensitizer and laser active components.

SUMMARY OF THE INVENTION

The present invention therefore comprises a laser active component and a sensitizer component with the laser active component being mounted within the sensitizer component and includes means to cool at least the sensitizer component.

It is therefore an object of the present invention to provide a more efficient laser device in which absorption and transfer of pumping energy are achieved, while fluorescent quenching is prevented.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
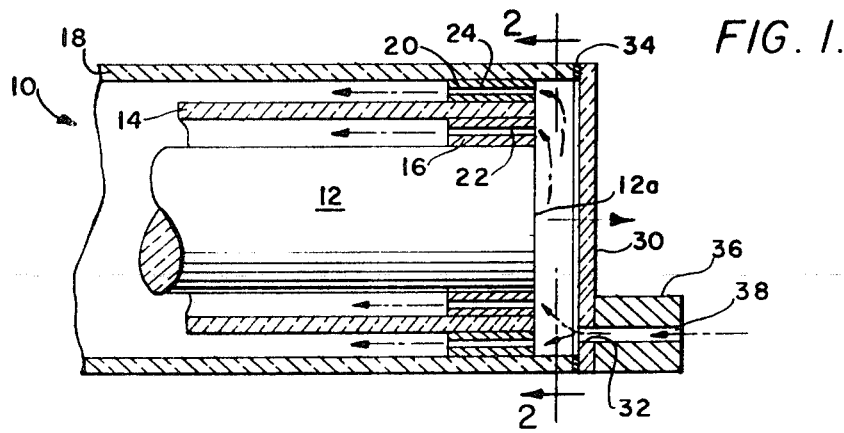
FIG. 1 is a cross-sectional view of an embodiment of the device of the present invention.
Figure 2:
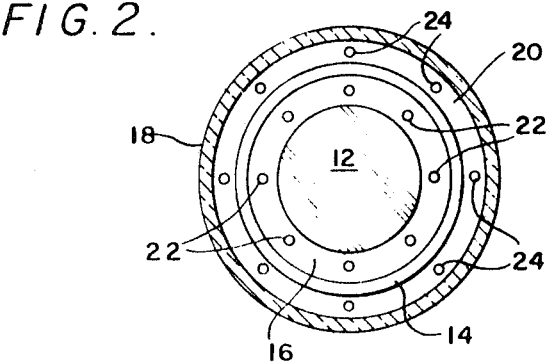
FIG. 2 is a vertical sectional view taken along the line 2—2 of FIG. 1.

Referring specifically to the embodiment of FIGS. 1 and 2, a laser device 10 is shown which consists of a laser active rod 12 enclosed in a tubular cladding 14, with a spacer sleeve 16 extending between the outer surface of the rod 12 and inner surface of the cladding 14. Since the construction of the laser apparatus 10 is substantially the same at each end, only one end is shown in FIG. 1 for convenience of presentation, it being understood that structure similar to that shown in FIG. 1 is provided at the opposite end of the device.

An outer tube 18 extends over the cladding 14 and is spaced from the cladding by another spacer sleeve 20, the length of the tube 18 being slightly greater than the length of the cladding 14 and the rod 12. The spacer sleeves 16 and 20 may be attached to their respective associated structure by use of adhesive or the like, or they can be suitable sized so that a snug fit is achieved.

As shown in FIGS. 1 and 2, a plurality of circularly spaced, axially extending openings 22 are provided through the spacer sleeve 16, and similar openings 24 are provided through the spacer sleeve 20.

An end cap 30 butts against the end of the protruding portion of the tube 18, and has an opening 32 extending therethrough. The cap may be attached to the end of the tube by adhesive or by suitable hardware, such as bolts, with a seal being provided by means of a gasket 34. A conduit block 36 is affixed to the end cap 30 and has a conduit 38 extending therethrough which registers with the opening 32 in the end cap.

As discussed above, the rod 12 is doped with laser ions while the tubular cladding 14 is doped with ions which sensitize the fluorescence of the laser ions. In this regard, it is to be understood that a particularly doped glass forms no part of the present invention. In fact, the glasses disclosed in application, Ser. No. 825,815 can be fabricated into the geometric shapes required for the present invention and can be utilized in the exact dopant ranges disclosed as sensitizer component and laser active component in that application for the corresponding sensitizer and laser active components of the present invention. As is well recognized in the art, the end of the rod shown in FIG. 1 is partially reflective and partially transmissive while the opposite end (not shown) is nearly totally reflective in order to form an optically resonant laser cavity. The ends of the cladding 14 are transmissive so that any oscillations produced within the cladding are restricted to the rod 12. For more specific details of the rod 12 and the cladding 14, reference is made to the above-identified application.

The tube 18 and the end cap 30 are both formed of a light transmitting material such as quartz, glass, plastic or the like which transmits light in the same wavelength as the cladding 14. It may be desirable to utilize end caps 30 as reflectors in which case suitable reflective coatings can be applied to the inner surfaces. With the opposite ends of the tube 18 formed plane and parallel to each other, the reflective end cap will be properly aligned to form a laser cavity.

This device and all other embodiments described in this specification is operated by light originating from a pump source such as a flash tube (not shown) disposed proximate to the device. The flash tube emits a flash of pumping light energy which is directed through the light transmitting tube 18, into and through the cladding 14 and to the rod 12, whereby the energy originating from the pump light produces an inversion in the laser ions, which inversion is assisted by the sensitizer ions within the cladding, with resultant emission of a beam of laser energy from the rod, which beam is emitted from the device through the partially transmitting end of the rod shown in FIG. 1, in a direction indicated by the solid arrow. A coolant fluid, such as water, is introduced into the coolant block 36 from an external source (not shown) through the opening 38, whereby it passes in a direction indicated by the dashed arrows, i.e., through the opening 32 in the end cap 30 and into the space defined by the inner surface of the end cap 30 and the tube 18, and the ends of the rod 12, the cladding 14 and the spacer sleeves 16 and 20. From this space the coolant passes through the openings 22 and 24 provided in the spacer sleeves 16 and 20, and into and through the cylindrical spaces between the rod 12 and the cladding 14, and between the cladding and the tube 18. It is understood that the coolant fluid passes through the entire axial lengths of the above cylindrical spaces, whereby it is exhausted through similar openings provided in the other end of the device (not shown).

Figure 3:
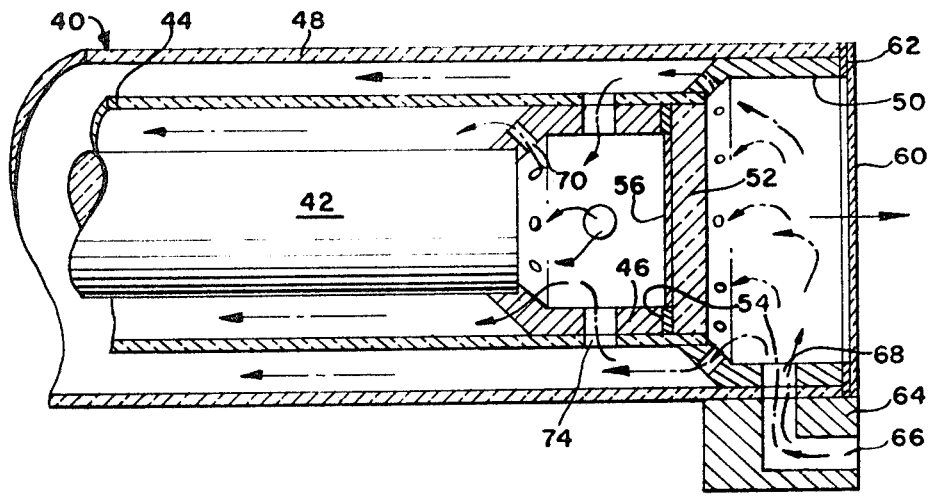
FIG. 3 is a cross-sectional view of another embodiment of the present invention.

In the embodiment of FIG. 3 a laser device 40 is shown having a laser rod disposed in an optically regenerative resonant cavity. In particular, a laser rod 42 is enclosed within a tubular cladding 44, the composition of the rod and the cladding being the same as in the previous embodiment. A sleeve 46 is fitted over the end of the rod 42 for supporting the rod coaxially within the cladding 44. As in the previous embodiment, only one end of the device is shown in FIG. 3 since the construction of the other end is substantially the same.

An outer tube 48 of a light transmitting material is supported over cladding 44 by means of a sleeve 50. The sleeves 46 and 50 may be secured to their respective components by means of adhesive, or may be designed to achieve a snug fit.

A reflector 52 is butted against the end of the sleeve 46 and flush with the end of the cladding 44, with a gasket 54 extending between the sleeve and the reflector. A reflective coating 56 is provided on the side of the reflector 52 facing the rod 42. The coating 56 is adapted for partially reflecting and partially transmitting laser light, it being understood that the corresponding surface or coating on the reflector located at the opposite end of the device is adapted for fully reflecting light. The reflectors are disposed in precisely parallel facing relation to each other. In an alternate variation, the reflectors may be butted against the ends of cladding 44 and be held in place by the biasing action of a spring or similar resilient device placed between the reflectors and the end cap 60. An advantage of this arrangement is that the cladding 44 can be easily cut, ground and polished so that when reflectors are press fitted against the ends, the reflectors will be at the required distance and will also be in parallel relation to each other.

End cap 60 is of a light transmitting material and butts against the ends of the tube 48 and the sleeve 50 with a gasket 62 providing a seal. The reflector 52 and the end cap 60 may be secured in the above positions by means of adhesive, or suitable hardware.

A conduit block 64 is affixed to the outer surface of the tube 48 and has an opening 66 extending therethrough which registers with a port 68 extending through the tube 48 and the sleeve 50. Each of the sleeves 46 and 50 have a plurality of spaced ports 70 and 72, respectively extending therethrough and a plurality of spaced ports 74 are provided through the cladding 44 and the adapter sleeve 46.

The above arrangement functions as in the previous embodiment when pumped from a pump source, whereby a beam of laser energy is emitted from the device in a direction indicated by the solid arrow in FIG. 3. Coolant from an external source (not shown) is introduced into the coolant block 64 through the opening 66 whereby it enters the space defined by the adapter sleeve 50, the reflector 52 and the end cap 60, in a direction indicated by the dashed arrows. It then flows through the ports 72 provided in the adapter sleeve 50, and passes into the cylindrical space between the cladding 44 and the tube 48. A portion of the coolant will then flow in this space for the axial length of the device, and another portion will pass from the space through the ports 74 and into the space defined by the adapter sleeve 46, the end of the rod 42 and the reflector 52. This portion of the coolant will flow through the ports 70 of the adapter sleeve 46, into the cylindrical space between the rod 42 and the cladding 44, and through the axial length of the device. After flowing in the above manner, the coolant from both of the above cylindrical spaces will be exhausted through similar structure provided at the other end.

Several variations in the above may be made within the scope of the invention. For example, it may be sufficient to circulate cooling through the axial length of only one of the two cylindrical spaces defined between the outer surface of the rod and the inner surface of the cladding, and between the outer surface of the cladding and the inner surface of the outer tube. Also, other coolants, such as air, may be utilized instead of water. Further, other means may be utilized to provide the spacing between the rod, the cladding and the outer tube, such as, for example, integral, radially extending flanges formed on one or more of the above components.

Figure 4:
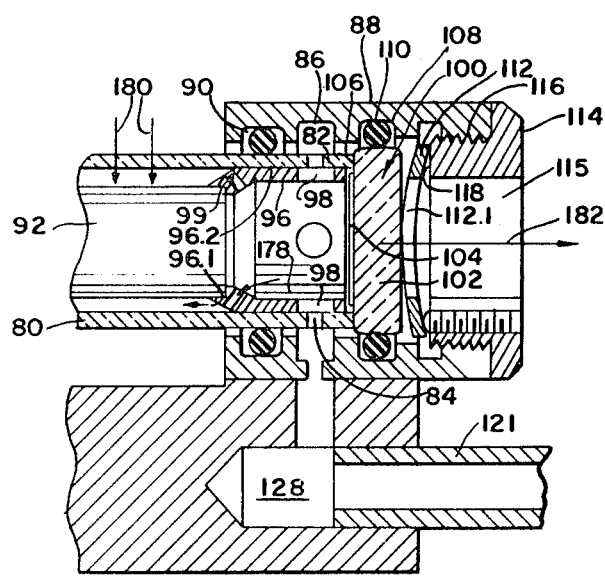
FIG. 4 is a cross-sectional view of another embodiment of the present invention.

Such a variation is shown in FIG. 4 which represents a device somewhat similar to the water cooled laser apparatus as set forth in U.S. Pat. No. 3,482,183 by M. R. Thorburn, the teachings of which are incorporated herein by reference. The structure set forth in U.S. Pat. No. 3,482,183 is usable in accordance with the present invention if the sensitizer component of the present invention is substituted for the tube or cylinder of light-transmitting material which jackets the cooling fluid in that patent.

Referring specifically to FIG. 4, sensitizer component 80 is shown which has opposite ends 82 (only one of which is illustrated in FIG. 4) and which are made as nearly plane and parallel to each other as is practicable. Sensitizer component 80 is also provided with a series of ports or openings 84 which are circumferentially spaced around the tube at each end of the tube to communicate with the annular grooves 86 extending around the inside of the frame member sleeves 88. Preferably, the frame member sleeves 88 are also grooved as indicated at 90 for receiving an annular gasket so that the sensitizer component 80 is sealed in liquid-tight relation to the frame member sleeve 88 at each end of the tube. A rod 92 of laser active material is then arranged within the sensitizer component tube 80. Preferably, a pair of adapter sleeves 96 are fitted into respective opposite ends of the rod 92 for supporting the rod within the tube 80 in coaxial relation to the tube. For example, in the practical construction shown in FIG. 4, the hollow adapter sleeve 96 has a small diameter recess 96.1 at one end to receive one end of the laser rod 92 and has a relatively large diameter portion 96.2 adapted to fit snugly within the tube 80 for centering the sleeve in the rod in the tube. The adapter sleeves can be attached to the laser rod or the sensitizer component tube 80 by the use of adhesive, if desired, for locating the rod 92 axially along the length of the tube 80. Alternatively, as shown in FIG. 4, the sleeves can be suitably sized so that, when fitted into opposite ends of the rod 92, they just fit within the tube 80 and support the rod 92 without being adhered or otherwise fixed to either the rod or the tube 80. The adapter sleeves 96 are preferably provided with a series of circumferentially spaced ports or openings 98 which communicate with the corresponding ports 84 in the sensitizer component 80. The adapter sleeves are also preferably provided with another series of circumferentially spaced ports 99 which communicate with the central portion of the tube 80.

It is desirable if this embodiment includes a pair of reflectors 100, each of which is preferably formed of a disc 102 of light-transmitting material such as glass, quartz or plastic and a plane, light-reflecting surface coating 104 on one side. These reflectors are then mounted in parallel, facing relation to each other against the plane parallel opposite ends 106 of the sensitizer component 80. As the sensitizer component 80 can be of relatively large diameter, the tube ends 106 provide relatively broad means against which to arrange the reflectors in accurate parallel relation to each other. In accordance with this invention, the light-reflecting surface or coating 104 on the reflector disc 100 shown in FIG. 4 is adapted for partially reflecting and partially transmitting light. However, the corresponding surface or coating 104 on the reflector 100 (not shown) located at the opposite end of the sensitizer component 80 is adapted for fully reflecting light.

In this embodiment of the invention, the reflectors 100 are held resiliently against the ends 106 of the sensitizer component 80. For example, as shown in FIG. 4, each of the frame member sleeves 88 is provided with a second gasket groove 108 which receives an annular gasket 110 for sealing a reflector disc 100 in liquid-tight relation within the sleeve 88. A spring washer 112 having a central opening 112.1 is arranged to bear resiliently against each reflector disc 100 and a collar 114 having a central opening 115 threadly engaged with each frame sleeve 88, as at 116. Preferably, each collar 114 has three set screws 118 therein, making three point contacts with the spring washer 112. In this construction, the collars 14 are rotatable in the sleeves 88 to bear against the spring washer 112 for resiliently holding the reflector discs 100 in parallel relation to each other against the tube ends 82. The set screws 118 are also adjustable for fine adjustment of the parallelism of the discs 100, as will be understood.

In accordance with this invention, means diagrammatically indicated in the drawings by the conduit 121 are adapted to pump or otherwise direct a stream of light-transmitting coolant fluid through a frame member port 128 and through communicating ports in other apparatus components into the tube or cylinder 80 as is diagrammatically indicated in FIG. 4 by the arrows 178. This coolant fluid 178 flows through the tube 80 around the laser rod 92 and, as will be understood, flows out of the tube 80 into the conduit 121 through corresponding ports or openings in apparatus components at the opposite end of the tube 80. In the preferred embodiment of this invention, the coolant fluid comprises water but other light-transmitting fluids such as air could also be directed through the tube 80 within the scope of this invention. As the means indicated by the conduit 121 for pumping the coolant fluid 178 through the tube 80 can be completely conventional, the pumping means are not further described herein and it will be understood that any conventional fluid circulating means can be employed for directing coolant fluid 178 through the tube 80 in the manner described.

In operating the laser apparatus above described, the collars 114 and set screws 118 are adjusted if necessary to arrange the reflectors 100 within the apparatus in precisely parallel, facing relation to each other. The light-transmitting coolant fluid is then directed through the tube 80 around the rod 92 of the selected laser active material. A flash tube (not shown) is then actuated for emitting a flash of laser pumping light or energy which is directed into and through the sensitizer component tube 80 and through the light-transmitting fluid 178 into the laser rod 92 as indicated in FIG. 4 by the arrows 180. This laser pumping energy assisted by energy transfer from the sensitizer component then stimulates emission of a beam of laser energy from the laser rod 92, which beam of energy is emitted from the apparatus through the partially transmitting reflector 100 as is indicated by the arrow 182 in FIG. 4.

In all of the embodiments of the present invention, the advantages of utilizing a laser active component doped with a laserable quantity of laser ions, and a sensitizer component doped with a quantity of sensitizer ions, as described in detail in the above-identified application is retained. Furthermore, heat is extracted from the device before it ever gets to the laser rod due to the cooling. As a result, most of the energy absorbed by the rod is at or near the emission wavelength of the rod material due to the optical coupling from the sensitizer ions where it is efficiently converted to light energy with very little heat being generated. Thus, not only is the energy transfer from sensitizer ions to laser ion more efficient, but also this arrangement prevents optical distortion of the active rod resulting from heat generated by the pump source in a high repetition rate system. The prevention of distortion is, of course advantageous.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A laser apparatus comprising structurally separate components, a first component in the form of a laser rod, a second component in the form of a cladding enclosing said rod, supporting means fitting within said cladding for supporting said rod within said cladding and for allowing a space between said rod and said cladding for the flow of a fluid coolant therethrough, entrance and exit ports communicating with said space between said rod and said cladding for allowing flow of a fluid coolant into and out of the space between said cladding and said rod, conduit means communicating with said ports for supplying coolant fluid through said ports, said laser rod being doped with a laserable quantity of laser ions, said cladding being doped with a quantity of sensitizer ions to absorb energy and transfer energy to the laser ions within said rod, said cladding being spaced from said rod at a distance sufficient to allow a coolant to pass between said cladding and said rod and enable efficient transfer of energy to take place from the sensitizer ions in the cladding to the laser ions in the laser rod.

2. The laser apparatus as set forth in claim 1 wherein said supporting means is a pair of spacer sleeves fitting within said cladding and supporting respective opposite end portions of said rod, said spacer sleeves defining openings through which said coolant is circulated.

3. The apparatus as set forth in claim 1 further comprising a tube of light transmitting material enclosing said cladding, second supporting means fitting within said tube for supporting said cladding within said tube and allowing a space between said cladding and said tube for the flow of a fluid coolant therethrough, second entrance and exit ports communicating with said space between said cladding and said tube for allowing the flow of a coolant into and out of the space between said tube and said cladding and means for supplying coolant fluid through said second ports.

4. The laser apparatus as set forth in claim 3 wherein said second supporting means is a pair of spacer sleeves fitting within said tube and supporting respective opposite end portions of said cladding, said spacer sleeves defining openings through which said coolant is circulated.

* * * * *